United States Patent

[11] 3,620,249

[72] Inventor Harold C. Simmons
Richmond Heights, Ohio
[21] Appl. No. 44,352
[22] Filed June 8, 1970
[45] Patented Nov. 16, 1971
[73] Assignee Parker-Hannifin Corporation
Cleveland, Ohio

[54] FLOW CONTROL VALVE FOR FUEL INJECTION NOZZLES AND THE LIKE
14 Claims, 2 Drawing Figs.

[52] U.S. Cl. .................................................. 137/503
[51] Int. Cl. .................................................. F16k 17/04
[50] Field of Search .......................................... 137/503,
501, 504; 60/39.74; 239/410

[56] References Cited

UNITED STATES PATENTS

| | | | |
|---|---|---|---|
| 1,923,595 | 8/1933 | Temple | 137/501 |
| 2,374,568 | 4/1945 | Terry | 137/501 |
| 2,387,364 | 10/1945 | Terry | 137/503 X |

Primary Examiner—M. Cary Nelson
Assistant Examiner—Robert J. Miller
Attorney—Oberlin, Maky, Donnelly & Renner ABSTRACT: A flow control valve characterized in the provision of a piston-actuated metering valve member in which the piston has one side thereof exposed to fluid pressure upstream of the metering orifice and the other side thereof exposed either to fluid pressure downstream of the metering orifice or to combustion chamber pressure, the piston being of such large size as to require a valve-biasing spring of such high spring rate that the friction of the metering valve member and of the piston in their guide bores in the valve body is negligible in comparison with the valve-operating forces, thus to render the metering valve member very sensitive to small changes in fluid pressure differential acting on opposite sides of the piston. Furthermore, an adjustable lower rate spring acts on the piston in opposition to the valve-biasing spring so as to enable accurate setting of the metering valve member.

Another characterizing feature of this invention is that the metering valve member and piston have radial floating and axial abutting engagement with each other to prevent binding contact between the metering valve member and its guide bore and between the piston and its guide bore despite eccentricity of said bores.

Yet another characterizing feature of this invention is the provision of a gimbal between the metering valve member and the adjacent end of the valve-biasing spring so as to prevent binding or cocking of the metering valve member in its guide bore in the event that the spring ends are not perfectly square relative to the axis of the metering valve member.

PATENTED NOV 16 1971

3,620,249

INVENTOR
HAROLD C. SIMMONS

BY Oberlin, Maky, Donnelly & Renner
ATTORNEYS

FLOW CONTROL VALVE FOR FUEL INJECTION NOZZLES AND THE LIKE

BACKGROUND OF THE INVENTION

In known piston-actuated metering valves such as disclosed for example in the Pats. To Davies et al. U.S. Pat. No. 3,022,954, Moebius et al. U.S. Pat. No. 3,159,971, and Simmons U.S. Pat. No. 3,443,760, the metering or variable area valve member is secured to a piston which has its opposite sides exposed to fluid pressure upstream of the metering orifice, whereby under low flow conditions, the valve member is actuated by fluid pressure acting on essentially the area of the valve seat. Since, in these cases the valve seat area is relatively small, the valve-biasing spring must have a relatively low spring rate to render the movements of the valve member sensitive to small changes in pressure acting on such small seat area under conditions of low flow; and hence, the valve-operating forces are of relatively low magnitude, whereby friction of the valve stem in its guide bore and of the piston in its guide bore, becomes a substantial factor when it is desired to move the valve member minute amounts for accurate metering under the influence of small pressure changes.

In such known metering valve constructions wherein the metering valve member is secured to the piston, eccentricity of the valve member and piston guide bores will cause binding contact between the piston and its guide bore and between the valve stem and its guide bore with resulting increase in friction and erratic action of the metering valve member responsive to small increase or decrease in fluid pressure. Furthermore, in such known constructions the valve-biasing spring is compressed directly between the valve body and the piston whereby if the ends of the spring are not perpendicular to the spring axis, there will again be a cocking or binding tendency to increase the friction between the piston and its guide bore and between the valve stem and its guide bore.

In the known constructions aforesaid, there is a control orifice between the valve inlet port and the metering orifice which, as the flow through the valve increases, results in an increasing pressure differential on opposite sides of the piston thus to increase the rate of flow through the metering orifice per unit increase in inlet pressure. If a prescribed fuel pressure is required at the fuel injection nozzle, the inlet pressure at the flow control valve must be of magnitude to take into account the pressure drops across the metering orifice and across the control orifice.

SUMMARY OF THE INVENTION

In contradistinction to the foregoing, the actuating piston for the metering valve member herein has its opposite sides respectively exposed to fluid pressure upstream of the metering orifice and to fluid pressure downstream of the metering orifice (or to combustion chamber pressure for example) so that the metering valve movements will be of substantial magnitude even though the valve-biasing spring has a high spring rate. In this way, the valve-operating forces are high, whereby friction of the valve stem and piston in their respective guide bores will be negligible so as not to influence the accurate movements of the metering valve member responsive to changes in fluid pressure acting on the piston.

A further object of this invention is to provide radial floating and axial abutting engagement between the piston and the metering valve member to eliminate binding of the piston in its guide bore or of the valve stem in its guide bore in the event that said bores are eccentric or misaligned.

Yet another object of this invention is to provide a gimbal between the metering valve member and the adjacent end of the valve-biasing spring thus to prevent cocking or binding action of the valve stem due to departure of the spring ends from squareness with respect to the spring axis.

Yet another object of this invention is to provide an adjustable low rate spring between the valve body and piston which acts in opposition to the valve-biasing spring thus to enable the making of very fine adjustments of the flow rate with reference to fluid pressure.

Still another object of this invention is to provide a piston chamber which has restricted communication with the inlet passage to form a dashpot to cushion the movements of the piston and of the metering valve member engaged thereby.

Other objects and advantages of the present invention will appear hereinafter.

DETAILED DESCRIPTION OF THE INVENTION

Figure 1:
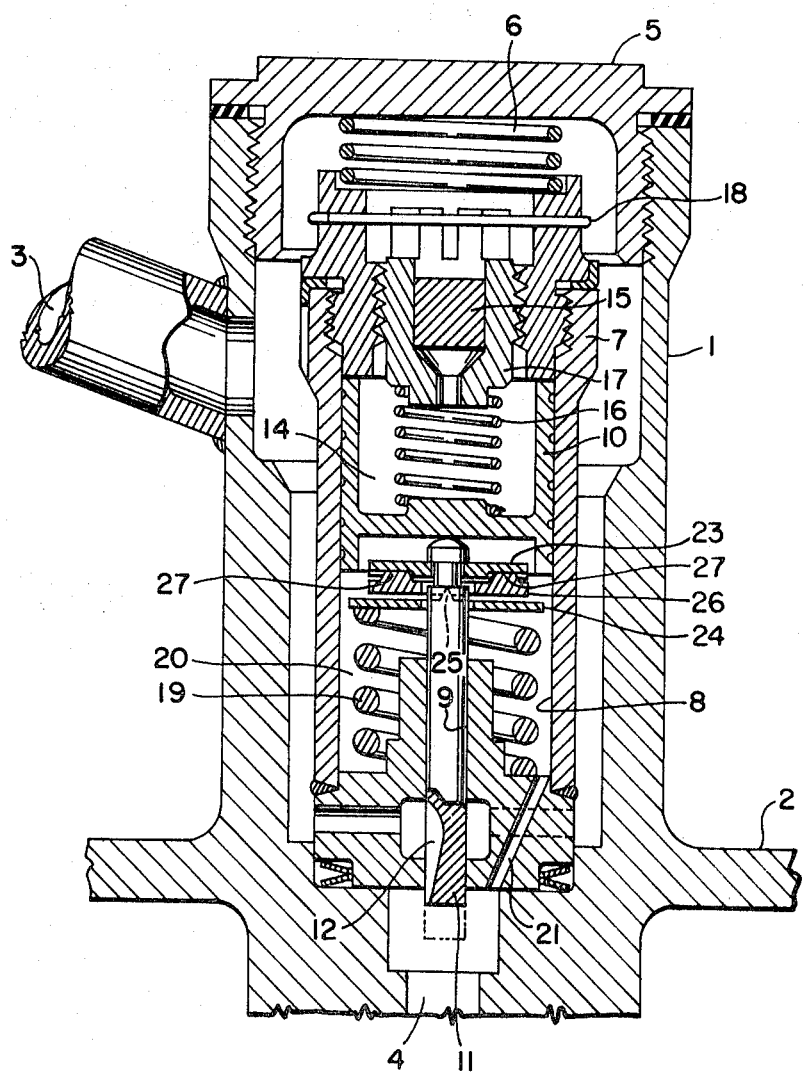
FIG. 1 is a diametrical cross-sectional view of a flow control valve embodying the present invention.

The flow control valve herein comprises a housing 1 which is adapted to be mounted on a combustion chamber wall of a gas turbine as by the flange 2 thereof, said housing 1 being provided with a fuel inlet passage 3 and a fuel outlet passage 4, the latter leading to a fuel injection nozzle (not shown).

Seated in the housing 1 by cap 5 and spring 6 is a valve body assemble 7 providing concentric guide bores 8 and 9 for the piston 10 and the metering valve member 11 respectively, the length of the valve guide bore 9 being several times the diameter of the valve member 11 so as to eliminate sticking action due to any lateral force thereon as may be occasioned by flow of fuel from the inlet 3 to the outlet 4 via the metering slot 12 in said metering valve member 11. The chamber 14 above the piston 10 has restricted communication via the porous plug 15 with the fuel pressure in inlet passage 3 which tends to move the piston 10 downwardly with the assistance of the low spring rate biasing spring 16. The pressure of the low rate spring 16 acting on the piston 10 may be adjusted by turning the spring backup member 17 and locking it in desired adjusted position as by means of the retainer 18 disposed in diametrical slots across the upper end of said backup member 17.

The metering valve member 11 has rounded upper end which is in radial floating and axial abutting contact with the flat bottom surface of the piston 9, whereby the guide bores 8 and 9 even though slightly eccentric due to manufacturing tolerances, will not cause binding action of the piston 10 in its guide bore 8 or the valve member 11 in its guide bore 9. Accordingly, when the piston 10 moves downwardly, the metering valve member 11 likewise will be moved downwardly to progressively increase the flow area of the metering orifice 12, but without binding or cocking action due to eccentricity of the guide bores 8 and 10.

In the illustrative embodiment of the invention herein disclosed the piston 10 area is many times greater than the maximum flow area of the metering orifice or slot 12 whereby a high rate spring 19 is required to control the movements of the metering valve member 11 responsive to changes in fuel pressure differential in the inlet and outlet passages 3 and 4 which acts on opposite sides of piston 10 viz chamber 14 which communicates with inlet passage 3 and chamber 20 which communicates with outlet passage 4 via passage 21. Because of the high rate spring 19, the friction between the valve member 11 and its guide bore 9 will be negligible so that the metering valve member 11 will move accurately in response to pressure changes acting on the large piston 10. The chamber 20 beneath the piston 10 is herein shown as being referenced to the pressure of the fuel in the outlet passage 4 but obviously this chamber 20 may be referenced to combustion chamber pressure or other pressure in the gas turbine.

To take into account departure of the spring 19 ends from being perpendicular to the spring axis and/or the axis of the metering valve member 11, a gimbal arrangement is provided between the metering valve member 11 and the spring 19, said gimbal comprising a spring follower 23 which is engaged with a shoulder adjacent the upper end of the metering valve member 11, a gimbal washer 24 which is engaged by the upper end of the spring 19 and which may be tilted about the diametrical knife edges 25 which contact in grooves of greater included angle in the intervening gimbal washer 26, and in turn, the intervening washer 26 may tilt about its knife edges 27 having engagement with grooves in the spring follower 23. In this way, the spring follower 23 will remain perpendicular to the axis of valve member 11 even though the upper end of the spring is inclined.

In the form of the invention illustrated in Fig. 1, the metering slot 12 permits flow from the inlet passage 3 to the outlet passage 4 as a fixed orifice until the pressure drop thereacross, and hence the pressure differential in chambers 14 and 20, is sufficient to start downward movement of the piston 10 against the bias of spring 19 (less the adjustable bias of the spring 16). Thereafter, the flow area of the metering slot 12 will increase progressively as the pressure differential in chambers 14 and 20 on opposite sides of piston 10 increases.

Figure 2:
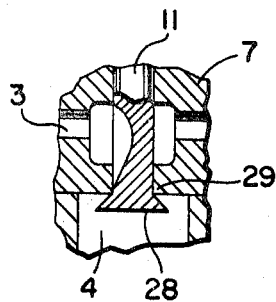
FIG. 2 is a fragmentary cross-sectional view illustrating a modification in which the metering valve has a closed position to prevent flow of fuel from the inlet to the outlet when the fluid pressure drops below a specified value.

If it be desired to completely close off fuel flow when the fuel inlet pressure drops below a predetermined value, the metering valve member 11 may be provided with a head 28 which engages seat 29 in valve body 7 as shown in Fig. 2.

In one specific embodiment of the invention, the ratio of the piston 10 diameter to the valve member 11 diameter was about 5.3:1 (i.e. about 0.375 inch to about 0.070 inch), and in the Fig. 1 embodiment the metering slot 12 of rectangular cross section varied from a minimum of 0.015 inch × 0.015 inch to a maximum of 0.015 inch × 0.030 inch over a stroke of about 0.060 inch to provide a flow range of about 4 p.p.h. to about 80 p.p.h. at pressure differentials from about 3 p.s.i. to about 150 p.s.i. In this case the spring 19 would have a rate of about 200 lb./in. as compared with valve-biasing springs of about 7 lbs./in. rate as would be used in the flow control valves of U.S. Pat. Nos. 3,022,954, 3,159,971, and 3,443,760, for comparable pressures and flow rates.

I, therefore, particularly point out and distinctly claim as my invention:

1. A flow control valve comprising a valve body having inlet and outlet passages; a valve member movable in said body and defining therewith a metering orifice through which fluid flows from said inlet passage to said outlet passage; spring means biasing said valve member in a direction tending to decrease the rate of flow of fluid through said metering orifice; a piston movable in said body and engaged with said valve member to move the latter in the opposite direction against the bias of said spring means to increase the flow through said metering orifice in response to increase in fluid pressure differential acting on opposite sides of said piston; said piston having its opposite sides exposed to fluid pressure respectively upstream and downstream of said metering orifice.

2. The valve of claim 1 wherein said valve member and said piston are slidable in concentric guide bores in said valve body; and wherein said valve member and piston have radial floating and axial abutting engagement to prevent binding of said piston and valve member in the respective bores in the event of eccentricity of said bores.

3. The valve of claim 1 wherein said spring means comprises a coil spring compressed between said body and valve member; and wherein a gimbal between said spring and said valve member prevents tilting of said valve member in the event that the ends of said spring are not perpendicular to the axis of said spring.

4. The valve of claim 1 wherein said piston has an area many times the maximum flow area of said metering orifice whereby said spring means and the operating forces on said valve member are so large as to render neglegible the friction of said valve member and piston in said body in influencing the variation in flow through said metering orifice responsive to change in fluid pressure differential acting on opposite sides of said piston.

5. The valve of claim 4 wherein an adjustable spring means having lower spring rate than said spring means biasing said valve member biases said piston against said valve member thus to accurately determine the minumum fluid pressure differential at which the valve member commences to move in a direction to increase the rate of flow of fluid through said metering orifice.

6. The valve of claim 1 wherein said valve member is cylindrical and is slidable in a guide bore in said body and has a variable depth slot in its surface which defines with said bore said metering orifice.

7. The valve of claim 6 wherein said piston is cylindrical and of diameter substantially larger than the diameter of said valve member and is slidable in a guide bore in said body which is coaxial with said valve member guide bore; and wherein said piston and valve member have radial floating and axial abutting engagement to prevent binding of said piston and valve member in their respective guide bores in the event of slight eccentricity of said guide bores.

8. The valve of claim 1 wherein fluid pressure upstream of said metering orifice has restricted communication with said piston thus to form a dashpot to cushion the movements of said piston and said valve member engaged thereby.

9. The valve of claim 2 wherein said valve member and piston have convexly rounded and plane surfaces in abutting engagement to permit relative angular float of said valve member and piston in the event of angular misalignment of said guide bores.

10. The valve of claim 3 wherein said gimbal comprises a first washer engaged with a shoulder on said valve member, a second washer engaged with said first washer for tilting of said second washer about a first line extending diametrically thereof, and a third washer engaged with the adjacent end of said spring, said third washer being engaged with said second washer for tilting of said third washer about a second line extending diametrically thereof at right angles to said first line.

11. A flow control valve comprising a valve body having inlet and outlet passages; a valve member and an actuating piston engaged therewith axially slidable in respective concentric guide bores in said body; said valve member when moved in said body defining therewith a variable area metering orifice for flow of fluid from said inlet passage to said outlet passage; spring means biasing said valve member in one direction to decrease the area of said metering orifice; said piston being exposed to fluid pressure in said inlet passage to move said valve member in the opposite direction against said spring means to increase the area of said metering orifice in response to increase in fluid pressure acting on said piston; said piston and valve member having radial floating engagement with each other to prevent binding of said piston and valve member in the respective bores in the event of slight eccentricity thereof.

12. The valve of claim 11 wherein said spring means comprises a coil spring compressed between said body and valve member; and wherein a gimbal means engaged by one end of said spring prevents application of tilting and binding force on said valve member in the event that the ends of said spring are not perpendicular to the axis thereof.

13. The valve of claim 11 wherein said valve member and piston have convexly rounded and plane surfaces in abutting engagement to permit relative angular float of said valve member and piston in the event of angular misalignment of said guide bores.

14. A flow control valve comprising a valve body having inlet and outlet passages; a valve member and an actuating piston engaged therewith axially slidable in respective concentric guide bores in said body; said valve member when moved in said body defining therewith a variable area metering orifice for flow of fluid from said inlet passage to said outlet passage; spring means biasing said valve member in one direction to decrease the area of said metering orifice; said piston being exposed to fluid pressure in said inlet passage to move said valve member in the opposite direction against said spring means to increase the area of said metering orifice in response to increase in fluid pressure acting on said piston; said valve member and piston having interengaged rounded and plane surfaces to prevent binding thereof in the respective bores in the event of slight eccentricity or angular misalignment of said bores.